United States Patent
Nakamura et al.

(10) Patent No.: US 6,657,789 B2
(45) Date of Patent: Dec. 2, 2003

(54) METHOD AND APPARATUS FOR MOVING BACK COMBINING SCREEN USED FOR HEAD-UP DISPLAY IN VEHICLE

(75) Inventors: Go Nakamura, Shizuoka (JP); Kunimitsu Aoki, Shizuoka (JP); Yoshihide Takada, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/132,327

(22) Filed: Apr. 26, 2002

(65) Prior Publication Data

US 2002/0167189 A1 Nov. 14, 2002

(30) Foreign Application Priority Data

May 11, 2001 (JP) .......................... 2001-142129

(51) Int. Cl.$^7$ .............................................. G02B 27/14
(52) U.S. Cl. ...................................... 359/632; 359/630
(58) Field of Search .............................. 359/630, 631, 359/632, 822, 838

(56) References Cited

U.S. PATENT DOCUMENTS

| | | | | |
|---|---|---|---|---|
| 3,552,828 A | * | 1/1971 | Lawrence et al. | 359/632 |
| 4,725,125 A | * | 2/1988 | Ellis et al. | 359/632 |
| 5,381,267 A | * | 1/1995 | Woody | 359/632 |
| 5,457,575 A | * | 10/1995 | Groves et al. | 359/631 |
| 5,517,337 A | * | 5/1996 | Dupin et al. | 359/13 |
| 6,301,052 B1 | * | 10/2001 | Carmeli | 359/630 |
| 6,504,518 B1 | * | 1/2003 | Kuwayama et al. | 345/7 |
| 2002/0012173 A1 | * | 1/2002 | Aoki et al. | 359/630 |

FOREIGN PATENT DOCUMENTS

JP  10268227 A  * 10/1998  ........... G02B/27/02

* cited by examiner

Primary Examiner—Ricky Mack
(74) Attorney, Agent, or Firm—Armstrong, Westerman & Hattori, LLP (57) ABSTRACT

The apparatus moves back a combining screen into a dashboard of a vehicle when the combining screen is not used. The combining screen is used for receiving an image emitted from a displaying device to superpose the image on a foreground of the vehicle such that the superposed image is visible for a driver's eye. The displaying device is disposed in the dashboard. The combining screen is positioned above the dashboard and inclined by a predetermined angle relative to an upward direction of the vehicle at its operational position. The apparatus has an outer moving means for moving the combining screen along a straight line between an operational position and an intermediate position and has an inner moving means for moving the combining screen along a curve between the intermediate position and a stored position in the dashboard. The intermediate position is located in the dashboard and above the displaying device. One of the inner and outer moving means has a cam channel and the combining screen has a pin movable along the cam channel. The cam channel and the pin define a cam moving mechanism to move the combining screen, while the other of the inner and outer moving means has a pin holding mechanism. The pin holding mechanism is movable with holding the pin to move the combining screen.

20 Claims, 12 Drawing Sheets

METHOD AND APPARATUS FOR MOVING BACK COMBINING SCREEN USED FOR HEAD-UP DISPLAY IN VEHICLE

BACKGROUND OF THE INVENTION

1. Field of the Invention

The present invention relates to a method and an apparatus for moving back a combining screen in a dashboard of a vehicle. The combining screen is used for superposing an image of optical information emitted from a displaying device on a foreground seen through a windshield of the vehicle so as to be visible from a driver's eye. The displaying device is disposed in the dashboard, and the combining screen is positioned above the dashboard at the operational position thereof.

2. Related Art

A head-up display used in a vehicle provides optional information required for operating the vehicle such that the information is superposed on a foreground visible through a windshield of the vehicle. A driver who is operating the vehicle can see the optional information with a less view line movement from the foreground.

One of such head-up displays provides optional information through a combining screen which is positioned to be inwardly spaced from a windshield. It is important that the combining screen is not an annoyance for a driver who is looking a foreground during the operation of the vehicle.

In the meantime, a larger displayed image has been desired, e.g. to display a foreground which is taken by an infrared ray camera in a worse sight condition at night.

When a larger sized combining screen is employed to show such a larger image, the combining screen is an annoyance for a driver particularly in the daytime where the combining screen is less used than at night. Therefore, it is preferable to move back the combining screen in a dashboard when the driver does not desire the use of the combining screen, even in an ordinarily sized combining screen.

However, the dashboard requires a larger accommodation space above a displaying device to receive the larger combining screen, since the combining screen is located between the windshield and the displaying device which is also accommodated in the dashboard.

The combining screen is generally inclined along the windshield, which makes the accommodation space further larger. Accordingly, it is not easy to move back the combining screen above the displaying device.

SUMMARY OF THE INVENTION

In view of the above-mentioned situation, an object of the invention is to provide a method and an apparatus for moving back a combining screen used for a head-up display disposed in a limited accommodation space of a dashboard of a vehicle when the combining screen is not used. The combining screen is used for superposing an image of optical information emitted from a displaying device on a foreground of the vehicle so as to be visible from a driver's eye. The displaying device is disposed in the dashboard, and the combining screen is positioned above the dashboard at its operational position.

For achieving the object, a first aspect of the invention is a method for moving back a combining screen in a dashboard of a vehicle when the combining screen is not used. The combining screen is used for superposing an image of optical information emitted from a displaying device on a foreground of the vehicle so as to be visible for a driver's eye. The displaying device is disposed in the dashboard. The combining screen is positioned above the dashboard and is inclined by a predetermined angle relative to an upward direction of the vehicle in an operational state of the combining screen. The method includes the step of moving the combining screen along a straight line between an operational position and an intermediate position, the intermediate position located above the displaying device in the dashboard. The method further includes the step of moving the combining screen along a curve between the intermediate position and a stored position where the combining screen is located adjacent to the displaying device in a longitudinal direction of the vehicle within the dashboard.

In the first aspect of the invention, the combining screen moves linearly between the operational position located above the dashboard and the intermediate position located above the displaying device in the dashboard. The dashboard requires an opening in the dashboard to pass the combining screen in an upright state, but the opening may be minimized in size.

In the meantime, the combining screen moves along the curve between the intermediate position and the stored position to be received adjacent to the displaying device in a longitudinal direction of the vehicle. Thus, the combining screen is received at the stored position not to vertically align with the displaying device.

During the movement of the combining screen along the curve between the intermediate position and the stored position, the inclination angle of the combining screen varies so that the combining screen can be received in the dashboard at the stored position in conformity with the layout of the displaying device.

Thus, the dashboard may have a comparatively smaller opening to pass the combining screen. The accommodation space of the combining screen in the dashboard is not located above the displaying device, allowing a minimized increase in size of the dashboard, particularly of the height thereof. The combining screen has a desired inclination at the stored position in conformity with the layout of the displaying device within the dashboard regardless of another inclination of the combining screen at the operational position. That is, the combining screen can be received within the dashboard efficiently in space.

A second aspect of the invention is an apparatus for moving back a combining screen in a dashboard of a vehicle when the combining screen is not used. The combining screen is used for receiving an image emitted from a displaying device to superpose the image on a foreground of the vehicle such that the superposed image is visible for a driver's eye. The displaying device is disposed in the dashboard. The combining screen is positioned above the dashboard and is inclined by a predetermined angle relative to an upward direction of the vehicle in an operational state of the combining screen. The apparatus includes:

an inner moving means for moving the combining screen between an intermediate position located above the displaying device in the dashboard and a stored position where the combining screen is located adjacent to the displaying device in a longitudinal direction of the vehicle in the dashboard and an outer moving means for moving the combining screen between the intermediate position and an operational position of the combining screen.

In the second aspect of the invention, the outer moving means moves between the combining screen the operational position located above the dashboard and the intermediate position located above the displaying device in the dashboard. The dashboard requires an opening in the dashboard to pass the combining screen in an upright state, but the opening may be minimized in size.

In the meantime, the inner moving means moves the combining screen between the intermediate position and the stored position to be received adjacent to the displaying device in a longitudinal direction of the vehicle. Thus, the combining screen is received at the stored position not to vertically align with the displaying device.

Preferably, one of the inner and outer moving means has a cam channel and the combining screen has a pin movable along the cam channel, the cam channel and the pin defining a cam moving mechanism to move the combining screen, while the other of the inner and outer moving means has a pin holding mechanism for holding the pin, the pin holding mechanism movable with the pin to move the combining screen.

The pin can be commonly used in the inner and outer moving means for moving the combining screen.

Thus, the inner and outer moving means each can move the combining screen along each path by efficiently utilizing the pin.

Preferably, the outer moving means includes the pin holding mechanism, and the pin holding mechanism has a pin locking lever, a pin locking and releasing means, and an urging means for urging the pin locking lever toward the pin. The pin locking lever is movable together with the pin between the operational position and the intermediate position. The pin locking and releasing mechanism keeps the pin locking lever holding the pin between the operational position and the intermediate position, while the pin locking and releasing mechanism keeps the pin locking lever disengaged with the pin between the intermediate position and the stored position. The urging means urges the pin locking lever toward the pin between the operational position and the intermediate position so that the pin locking lever can hold the pin.

Thus, the combining screen is transferred from the inner moving means to the outer moving means at the intermediate position so that the locking lever holds the pin to move the combining screen toward the operational position. In the meantime, the urging means keeps the pin held by the locking lever until the combining screen reaches the intermediate position when the combining screen is moved from the operational position to the intermediate position.

Thus, the combining screen is surely moved from the operational position to the intermediate position.

Preferably, the inner and outer moving means are located adjacent to the displaying device in a lateral direction of the vehicle.

Thereby, the combining screen has no interference relation with the inner and outer moving means between the intermediate position and the stored position. Thus, the combining screen is efficiently received together with the moving means in the dashboard.

Preferably, the inner moving means moves the combining screen with varying the inclination of the combining screen between the intermediate position and the stored position.

During the movement of the combining screen along the curve between the intermediate position and the stored position, the inclination angle of the combining screen varies so that the combining screen can be received in the dashboard at the stored position in conformity with the layout of the displaying device.

The combining screen has a desired inclination at the stored position in conformity with the layout around the displaying device within the dashboard regardless of another inclination of the combining screen at the operational position. That is, the combining screen can be received within the dashboard efficiently in space.

Preferably, the apparatus further includes a cover closing an opening of the dashboard and a link for moving the cover, the opening being used for passing the combining screen when the combining screen moves between the intermediate position and the operational position. The link is operatively connected to the combining screen to move the cover in response to the movement of the combining screen.

Thus, the cover can open and close the dashboard opening without any additional driving unit, since the link can move the cover in relation to the movement of the combining screen between the stored position and the operational position.

Preferably, the link is operatively connected to the inner moving means so that the link can open and close the cover in response to the movement of the combining screen between the intermediate position and the stored position.

Thus, the cover can open and close the dashboard opening in relation to the movement of the combining screen between the stored position and the intermediate position such that the dashboard opening is opened before the combining screen moves from the intermediate position to operational position while the dashboard opening is closed after the combining screen has moved to the stored position. [106]

Accordingly, the combining screen can move into and out of the dashboard in no interference relationship with the cover unit.

Preferably, the cover has an intercepting plate that interrupts a driver's view line to enter the dashboard through the opening when the opening is opened.

Thus, the intercepting plate prevents the driver's view line from entering the dashboard through the opening when the opening is opened. This prevents light emitted from the displaying device from directly undesirably reaching the driver's eye through the opening.

That is, the opening of the dashboard causes no annoyance for the driver even in the open state of the opening.

DETAILED DESCRIPTION OF PREFERRED EMBODIMENTS

Referring to the accompanied drawings, an embodiment of an apparatus for moving back a combining screen employed in a head-up display according to the present invention will be discussed.

Figure 1:
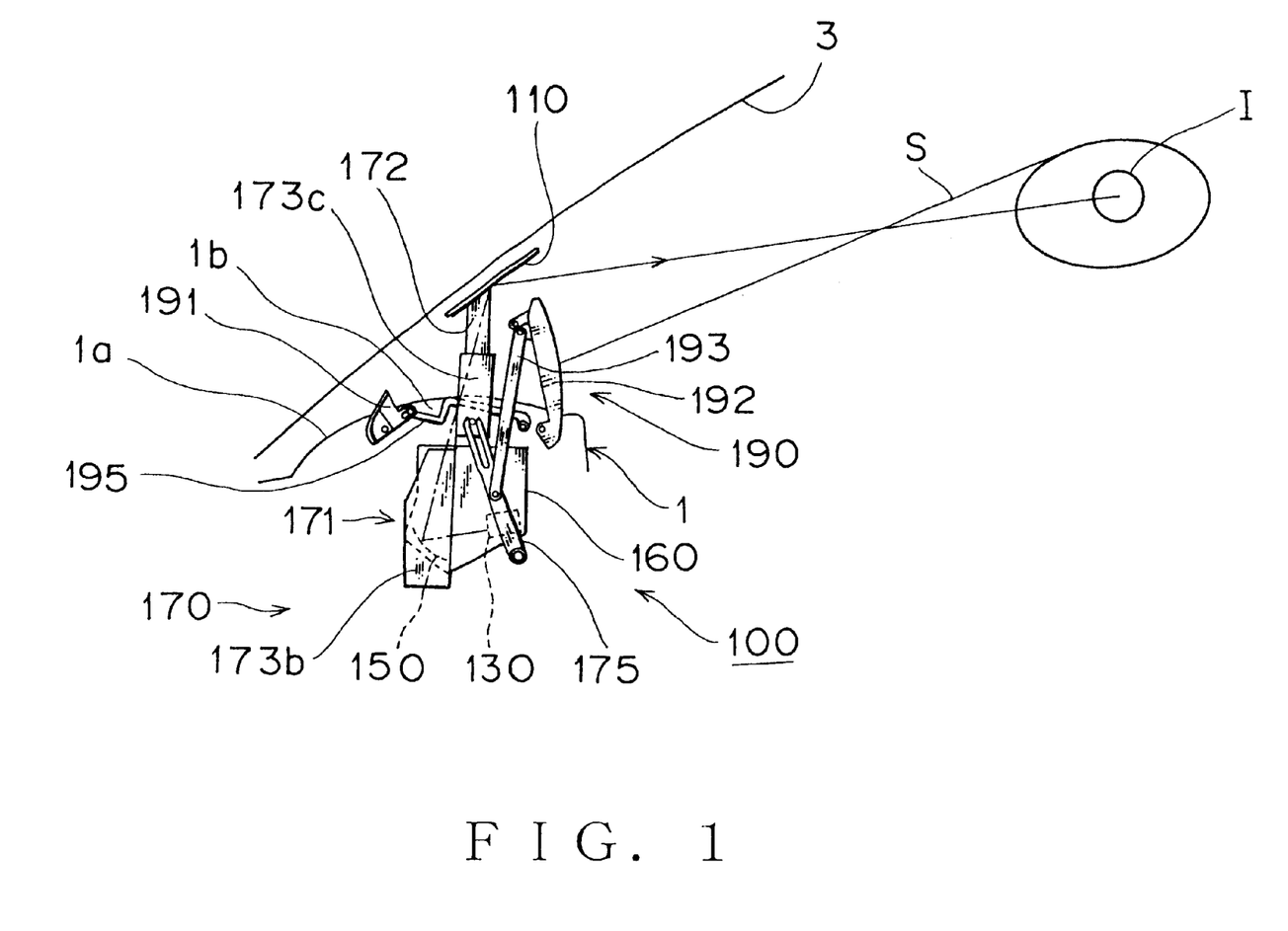
FIG. 1 is a sectional view illustrating an operational state of a head-up display of an embodiment employing a combining screen moving back apparatus according to the present invention, the combining screen being at its operational position.

FIG. 1 is a sectional view illustrating an operational state of an embodiment of a head-up display 5 according to the present invention. Reference numeral 100 designates the head-up display of the embodiment. The head-up display superposes an image emitted toward combining screen 110 on a foreground visible through a windshield 3 positioned forward of the combining screen 110. The combining screen 110 is located in its operational condition above an opening 1b formed in an upper surface 1a of a dashboard 1 along the windshield 3 having a substantially uniform inclination angle relative to a vertical or longitudinal direction of a vehicle.

The head-up display 100 further has a displaying device 130 for displaying an image projected on the combining screen 110, a magnifying reflector 150, an elevating unit 170 for the combining screen 110, a cover unit 190, etc. The dashboard 1 accommodates the displaying device 130, the magnifying reflector 150, and the elevating unit 170.

Figure 2:
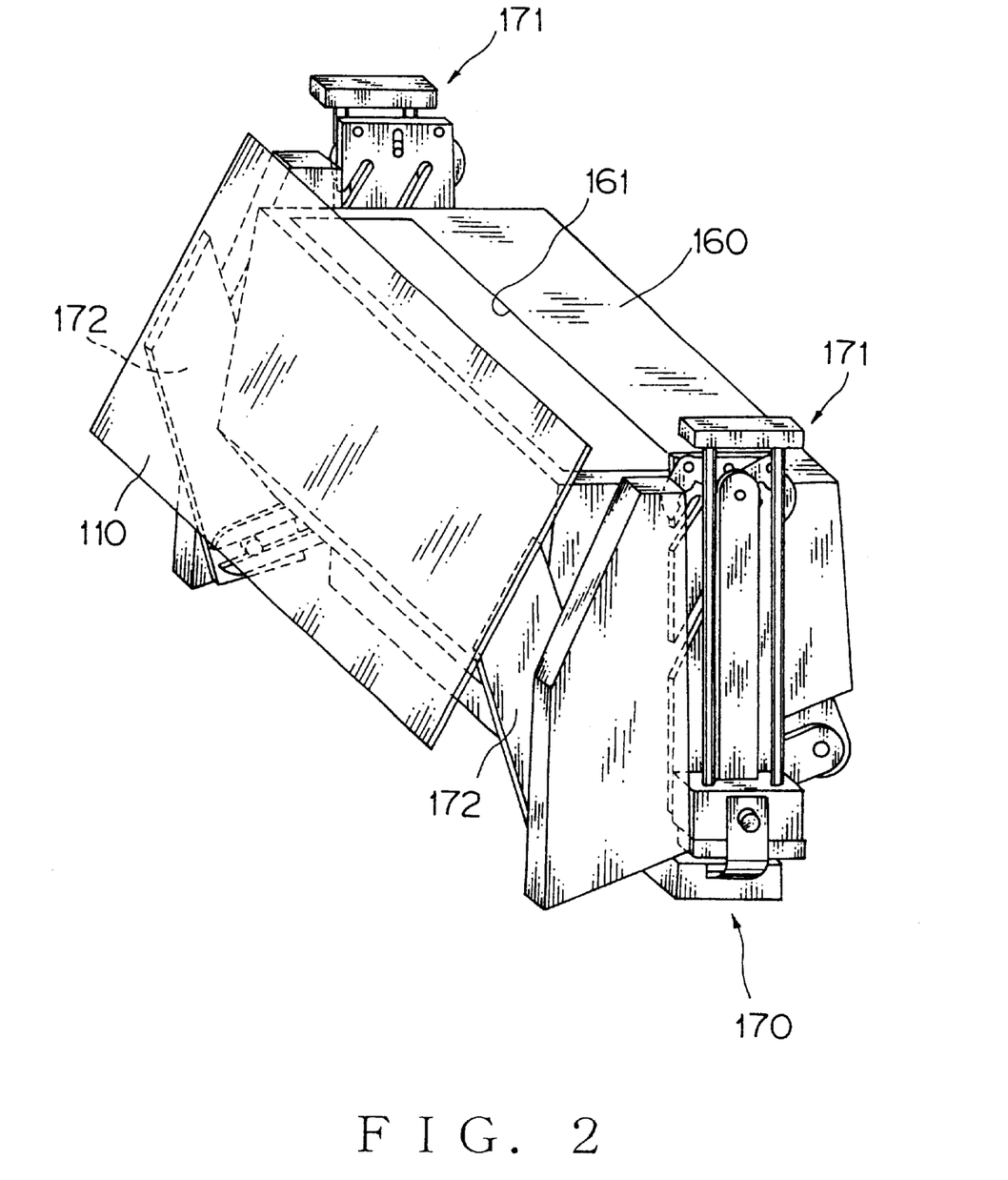
FIG. 2 is an enlarged perspective view showing a unit including a displaying device and a magnifying reflector which are shown in FIG. 1.

The displaying device 130 and the magnifying reflector 150 are defined in a unit which is received in a case 160 having an upper opening 161 for emitting an image for projecting it on the combining screen as illustrated in an enlarged perspective view of FIG. 2. The elevating unit 170 has a pair of left and right link units 171 symmetrical with each other and each positioned at each lateral side of the case 160 to be connected to the combining screen 110 for elevation of the combining screen 110.

Figure 3:
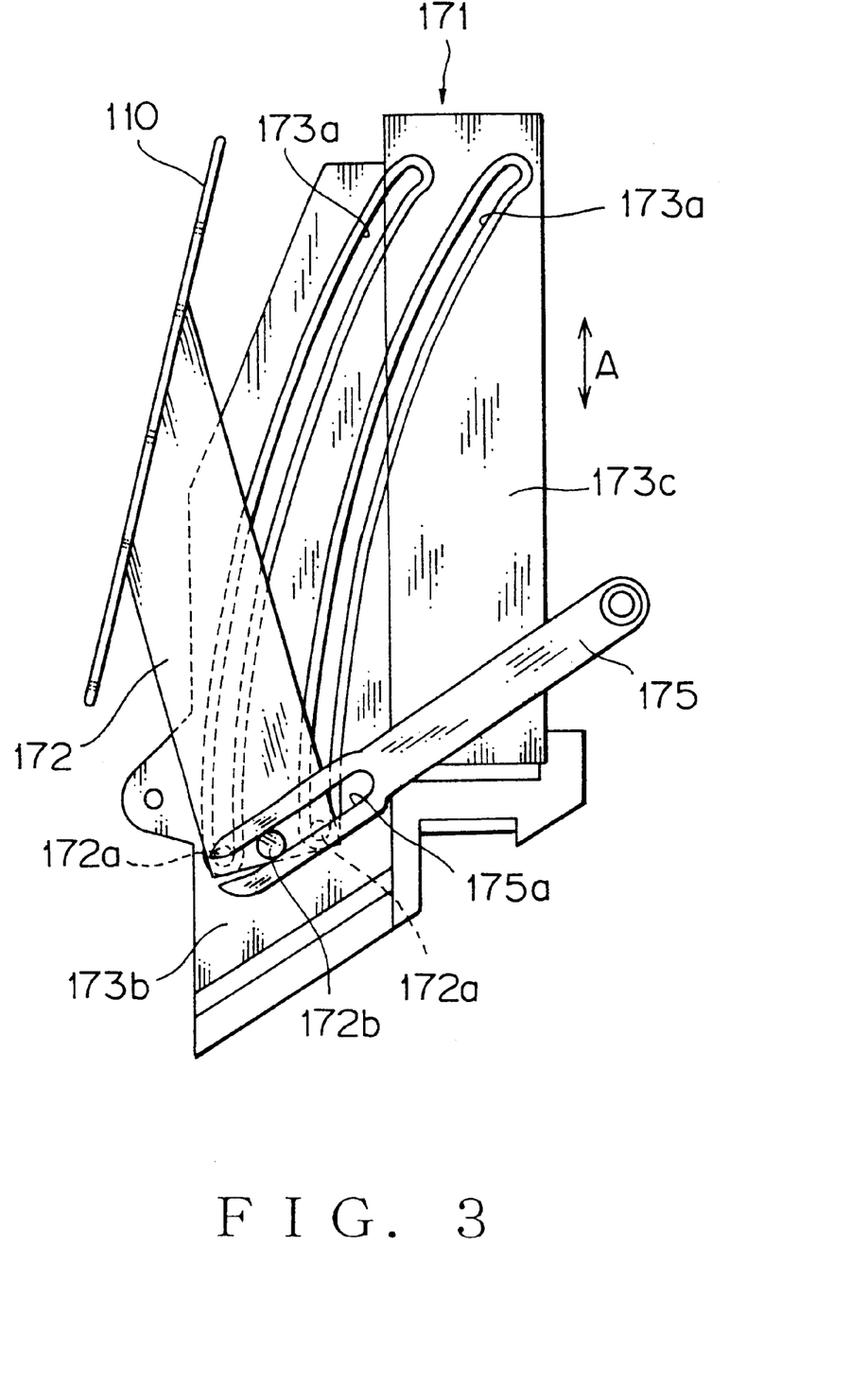
FIG. 3 is a side view showing an operation state of a link unit of FIG. 2.

Referring to each link unit 171 in more derail, the link unit 171 has a supporting strut 172 joined to one side of the combining screen 110, and the supporting strut 172 has a pair of guide pins 172a projected from its outer side surface at a lower end thereof as illustrated by imaginary lines of FIG. 3. Furthermore, the supporting strut 172 has a link pin 172b projected from its inner side surface at a lower end thereof as illustrated by a solid line of FIG. 3.

The elevating unit 170 further has a fixed base frame 173b and a movable base frame 173c, and across the fixed base frame 173b and the movable base frame 173c, there are provided a pair of arc-shaped guide cam slots 173a for guiding the pair of guide pins 172a.

An upper part of each guide cam slot 173a is formed in the movable base frame 173c so as to penetrate the movable base frame 173c, while the other lower part of the guide cam slot 173a is formed in an inner side surface of the fixed base frame 173b.

The movable base frame 173c moves relative to the fixed base frame 173b in a direction shown by a double head arrow A in FIG. 3.

Figure 4:
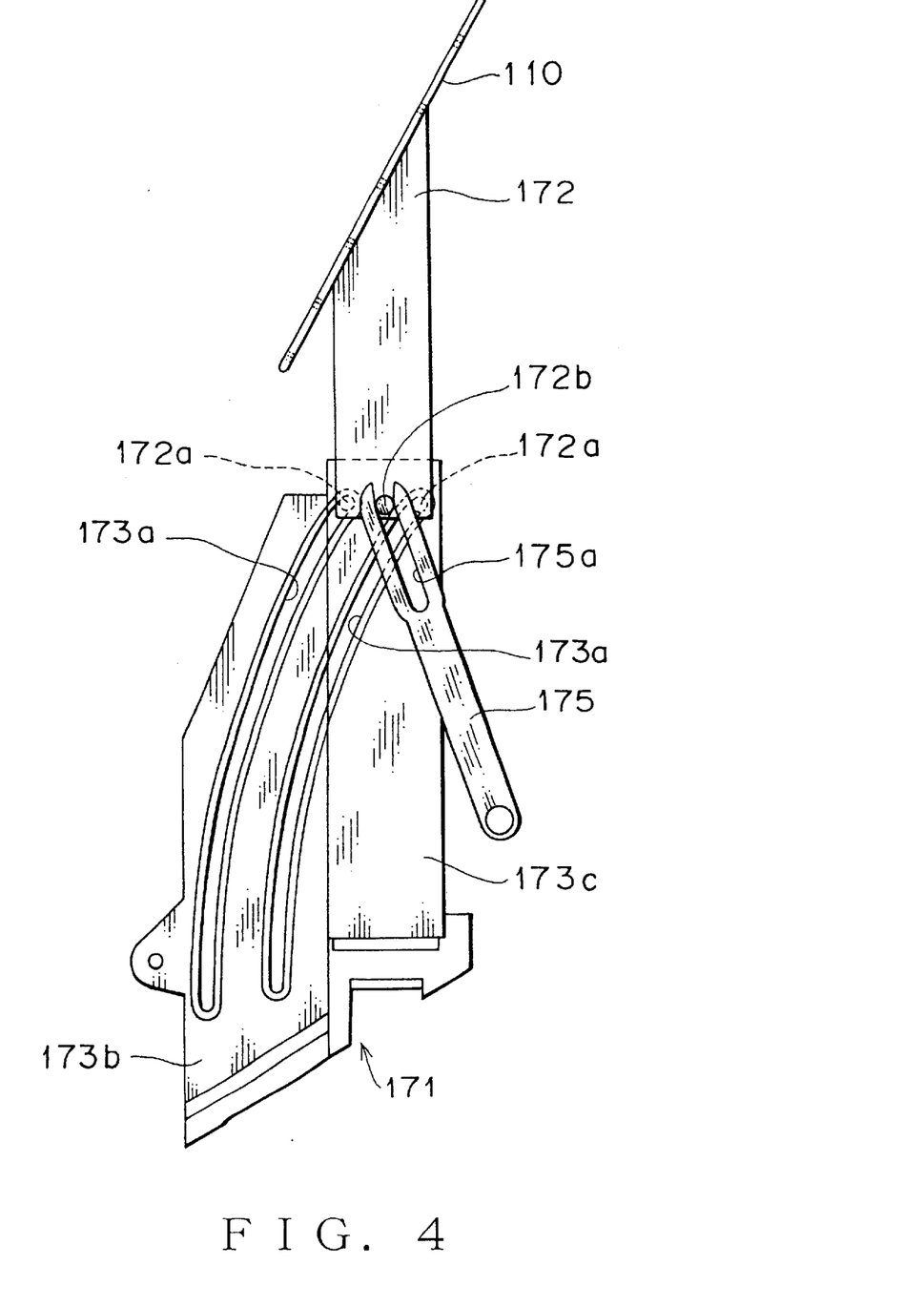
FIG. 4 is a side view showing another operation state of the link unit of FIG. 2.

The pair of guide pins 172a of the supporting strut 172 move from the lower ends to the upper ends of the guide cam slots 173a which are formed across the fixed base frame 173b and the movable base frame 173c, so that the combining screen 110 joined to the supporting strut 172 moves from a stored position shown in FIGS. 2 and 3 to an intermediate position shown in FIG. 4 within the dashboard 1. At the stored position, the combining screen 110 is located in front of the case 160 in a forward direction of the vehicle, while at the intermediate position, the combining screen 110 is positioned above the case 160.

The movement of the supporting strut 172 together with the combining screen 110 between the stored position and the intermediate position is carried out by a swing arm 175. The swing arm 175 has an elongated slot 175a formed at a fore end thereof for slidably receiving the link pin 172b of the supporting strut 172, and the swing arm 175 is swung by a motor (not shown) between the states shown in FIGS. 3 and 4. At the intermediate position of the combining screen 110, the link pin 172b of the supporting strut 172 is positioned around an open end of the elongated slot 175a of the swing arm 175 as illustrated in FIG. 4.

Since each guide cam slot 173a defines an arc shape, the movement of the guide pins 172a along the guide cam slots 173a varies the inclination angle of the combining screen 110 during the shift of the combining screen 110 between the stored position and the intermediate position. The inclination of the combining screen 110 orients generally in a vertical direction of the vehicle at the stored position, while the inclination of the combining screen 110 is generally parallel to the windshield 3 at the intermediate position.

Figure 5:
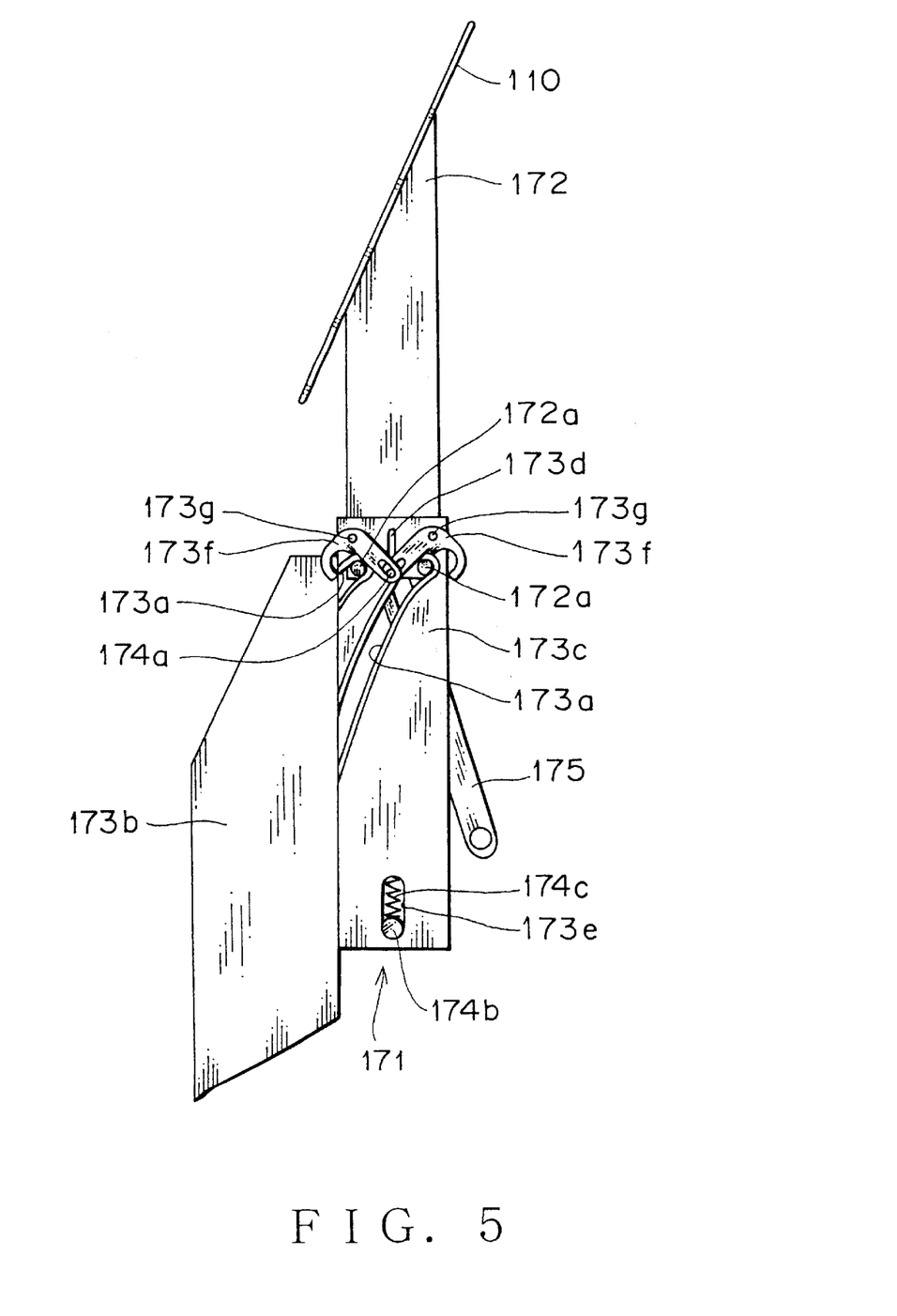
FIG. 5 is a side view showing further another operation state of the link unit of FIG. 2.

As illustrated in FIG. 5 showing an outer side view of the link unit, there are provided vertically elongated holes 173d and 173e each formed at an upper or lower end portion of the movable base frame 173c to penetrate the movable base frame 173c. Furthermore, a pair of locking levers 173f are provided on an outer surface of the movable base frame 173c at an upper end portion of the movable base frame 173c near the top ends of the guide cam slots 173a.

Figure 6:
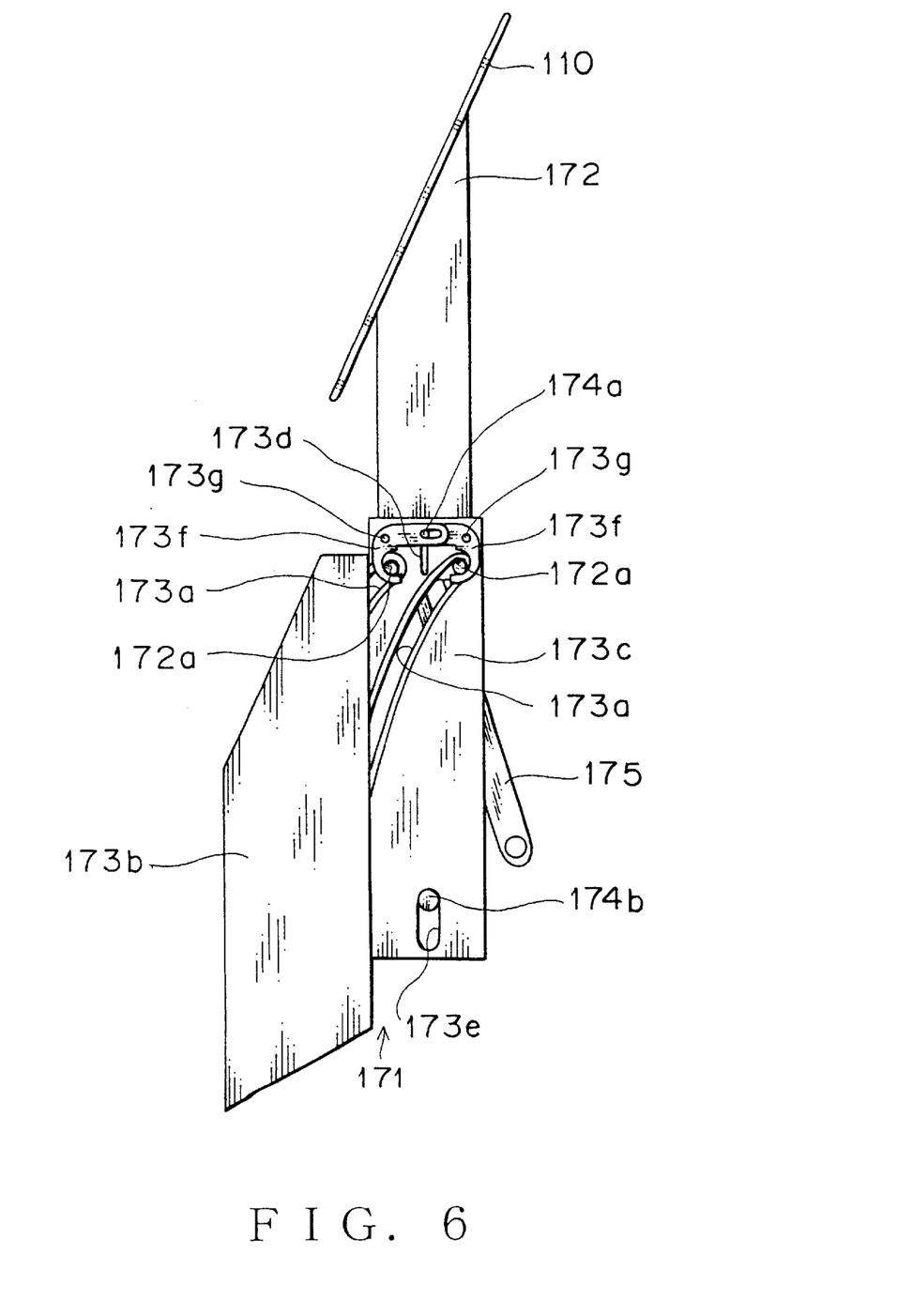
FIG. 6 is a side view showing further another operation state of the link unit of FIG. 2.

Each locking lever 173f swings around a fulcrum 173g to hold each guide pin 172a which has been located at the top of each guide cam slot 173a as illustrate in FIG. 6, when a connection pin 174a formed on the supporting strut 172 moves upward within the elongated hole 174d. In the meantime, the locking lever 173f swings around the fulcrum 173g to release the guide pin 172a as illustrate in FIG. 5, when the connection pin 174a moves downward within the elongated hole 174d.

Figure 7:
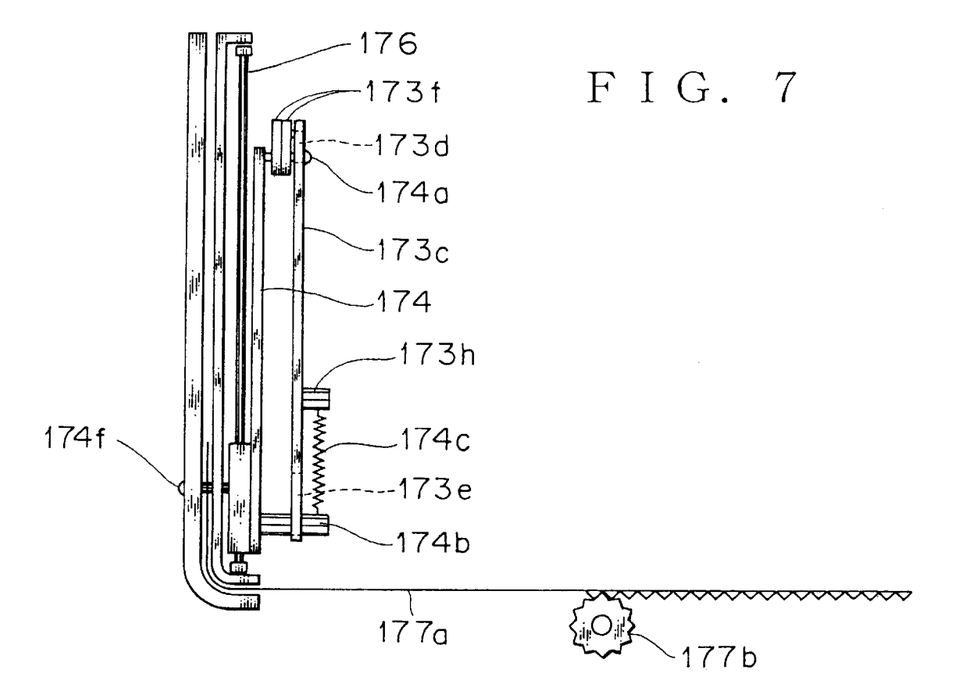
FIG. 7 is a rear view showing an operation state of the link unit of FIG. 2.

As illustrated in FIG. 7, an elevating frame 174 is provided in an outer side of the movable base frame 173c parallel to the movable base frame 173c. The elevating frame 174 has the connection pin 174a on an inner surface around an upper end of the elevating frame 174, and the connection pin 174a penetrates through the pair of locking levers 173f to be received in the elongated hole 174d of the movable base frame 173c.

The elevating frame 174 further has a spring-biased, inwardly projected spring securing pin 174b received in the elongated hole 173e located at a lower side of the movable base frame 173c. The spring securing pin 174b is connected to one end of a tension spring 174c, and the other end of the tension spring 174c is connected to another spring securing pin 173h projected from an inner surface of the movable base frame 173c a little above the elongated hole 173e. The tension spring 174c acts to bring the spring securing pins 173h, 174b close to each other.

The elevating frame 174 is slidably supported by a guide frame 176 positioned outside the elevating frame 174. Thus, the elevating frame 174 moves upward along the guide frame 176, so that the connection pin 174a moves from the bottom to the top of the elongated hole 173d while the spring securing pin 174b moves upward within the elongated hole 173e. During the movements, only the elevating frame 174 moves upward relative to the movable base frame 173c.

Figure 8:
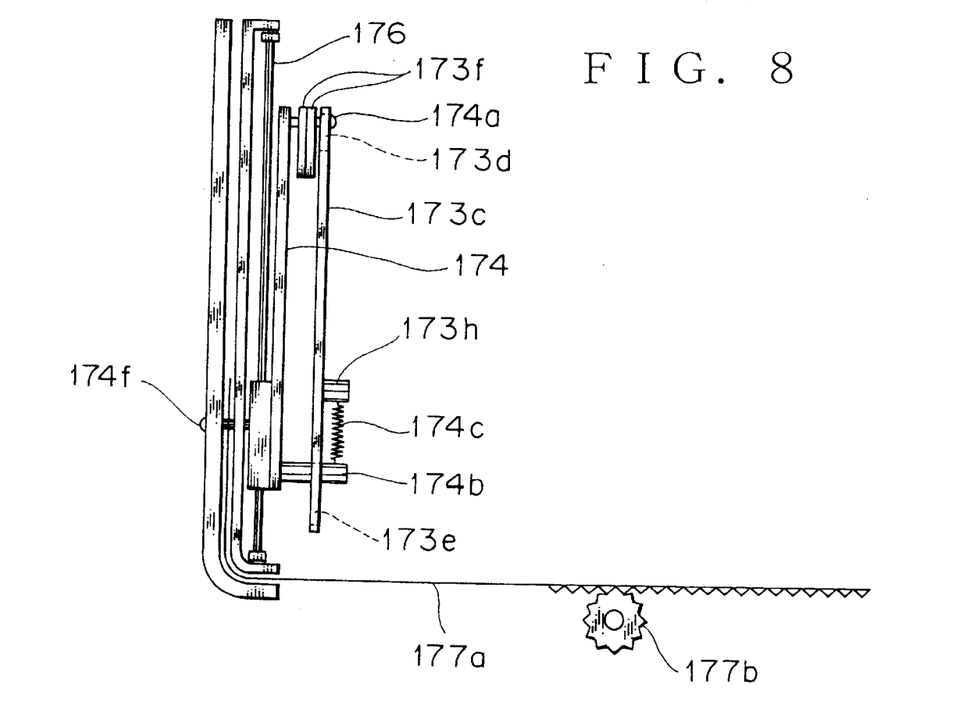
FIG. 8 is a rear view showing further another operation state of the link unit of FIG. 2.

After the connection pin 174a has reached the top of the elongated hole 174d and the spring securing pin 174b also has reached the upper end of the elongated hole 173e as illustrated in the side view of FIG. 8, the movable base frame 173c moves together with the elevating frame 174 via the connection pin 174a and the spring securing pin 174b.

The movement of the connection pin 174a from the bottom to the top of the elongated hole 173d swings each locking lever 173f from the state shown in FIG. 5 around each fulcrum 173g, so that the locking levers 173f hold the guide pins 172a positioned at top ends of the guide cam slots 173a as illustrated in FIG. 6.

Figure 9:
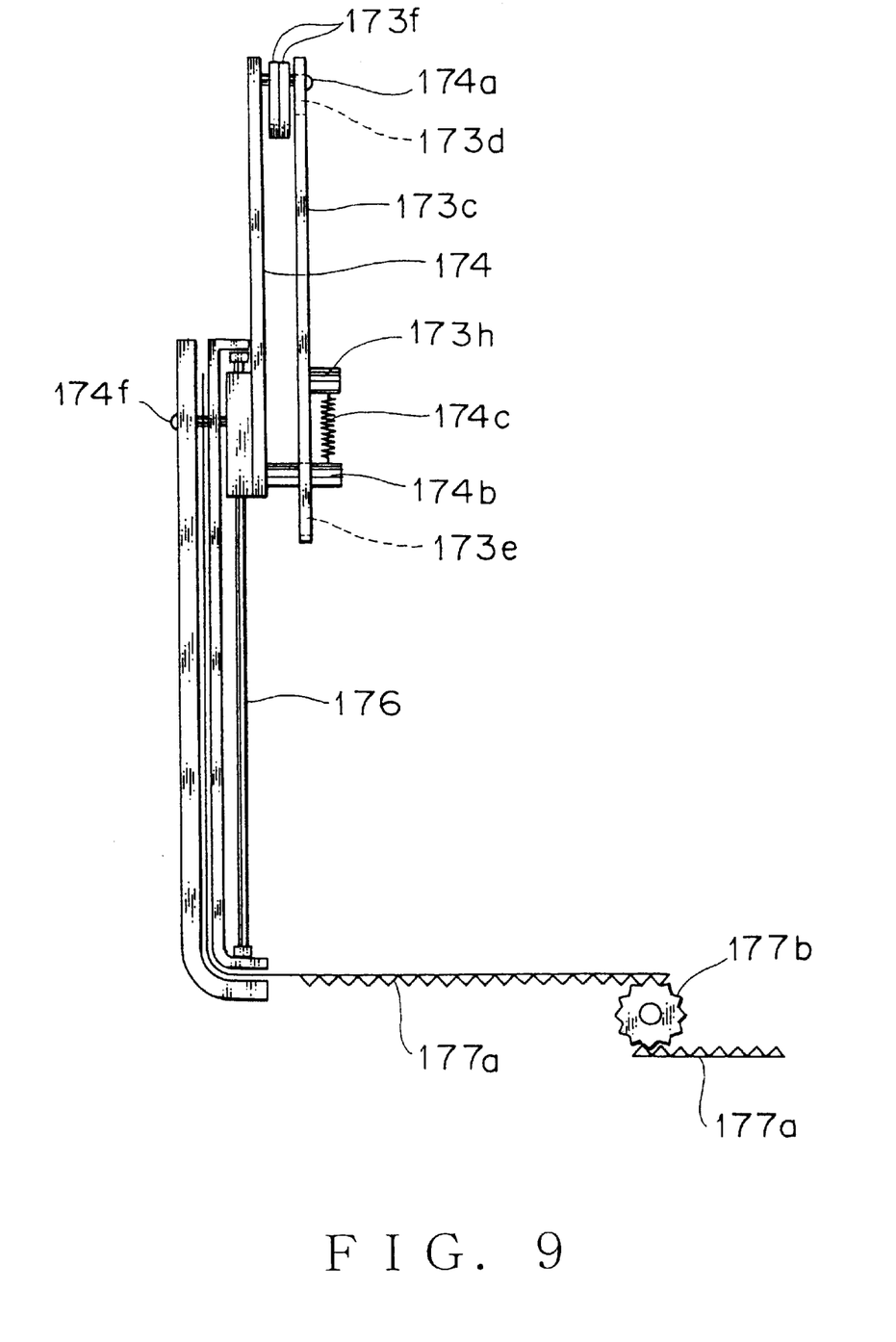
FIG. 9 is a rear view showing further another operation state of the link unit of FIG. 2.
Figure 10:
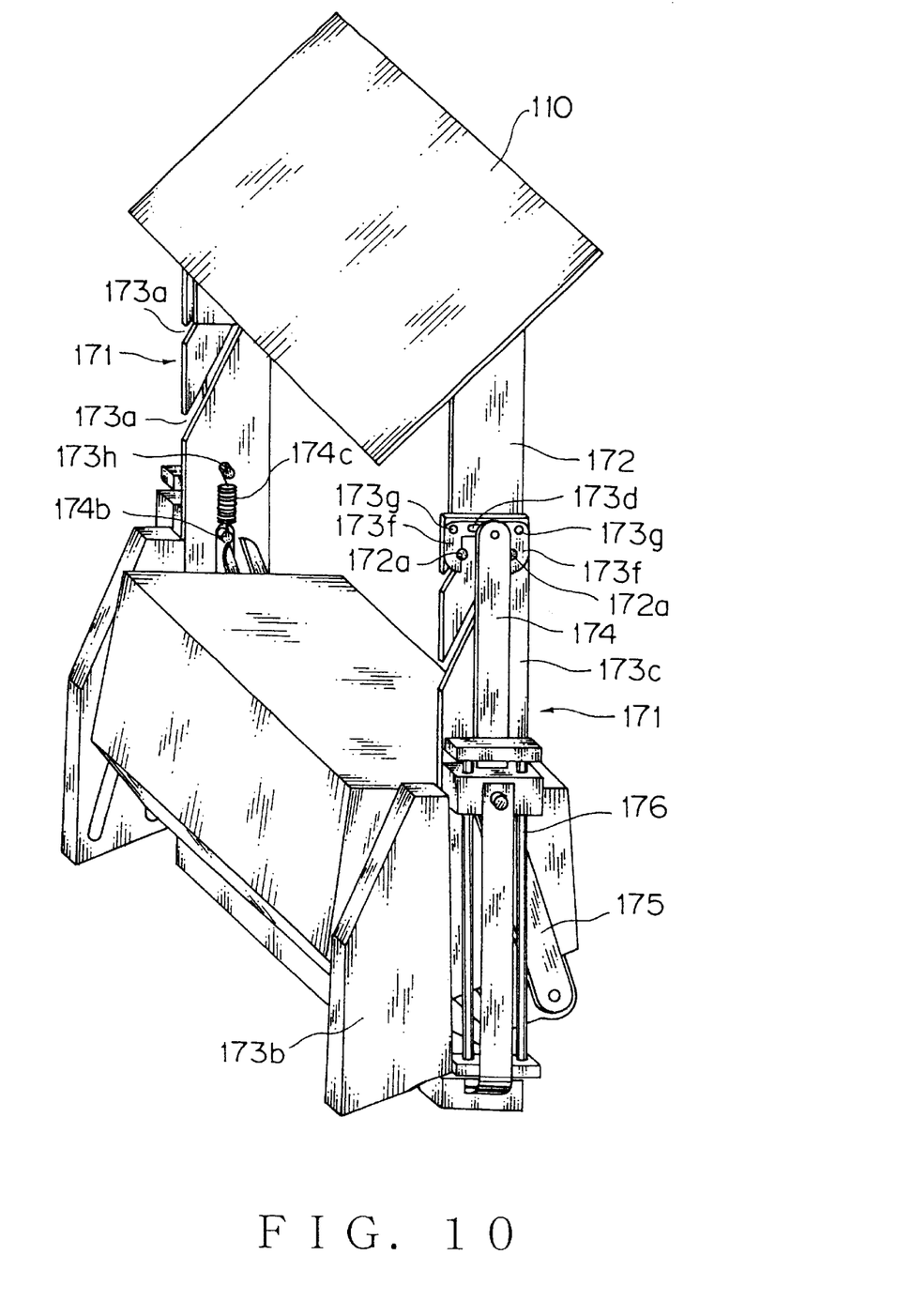
FIG. 10 is a perspective view showing an operation state of the link unit of FIG. 2, which includes the combining screen.

As illustrated in the side view of FIG. 9, a further upward movement of the elevating frame 174 moves the movable base frame 173c together with the combining screen 110 joined to the supporting strut 172, since the guide pins 172a of the supporting strut 172 have been engaged with the locking levers 173f of the movable base frame 173c. Finally, the elevating frame 174 reaches the highest position along the guide frame 176 as illustrated in the perspective view of FIG. 10.

Accordingly, the combining screen 110 is moved outside the dashboard 1 to reach the operational position shown in FIG. 1 where the combining screen 110 is located between the windshield 3 and the driver's eye.

At the intermediate position of the combining screen 110 which is shown in FIG. 4, the pair of locking levers 173f have released the pair of locking levers 173f as illustrated in FIG. 5. The locking levers 173f hold the guide pins 172a when the supporting strut 172 moves upward a little together with the combining screen 110 from the intermediate position as illustrated in FIG. 6.

The elevating frame 174 is moved upward and downward by a motor (not shown) through a timing belt 177a between the intermediate position shown in FIG. 4 and the operational position shown in FIG. 1 or 9. The timing belt 177a has one end connected to a connection pin 174f projected from an outer surface of the elevating frame 174 as illustrated in FIGS. 7 to 9. The timing belt 177a has a proper elasticity that can transmit a driving force of the motor via a pulley 177b. The motor driving force can also move another elevating frame 174 of another link unit 171 via another pulley 177b and another timing belt 177a. The motor is different from the previously mentioned one that can move the swing arm 175.

The reverse rotation of the latter motor moves the timing belt 177a via the pulley 177b so that the elevating frame 174 is moved downward from its highest position along the guide frame 176. Thereby, the combining screen 110 is moved together with the supporting strut 172 downward from the operational position to the intermediate position. During the downward movement, the tension spring 174c urges the spring securing pins 173h, 174b to come close to each another. Thus, the movable base frame 173c moves downward together with the elevating frame 174.

That is, the locking levers 173f have been holding the guide pins 172a until the elevating frame 174 reaches its lowest position along the guide frame 176 as illustrated in FIG. 5. Because, the connection pin 174a has not reached the lower end of the elongated hole 173d before the combining screen 110 reaches the intermediate position.

Figure 11:
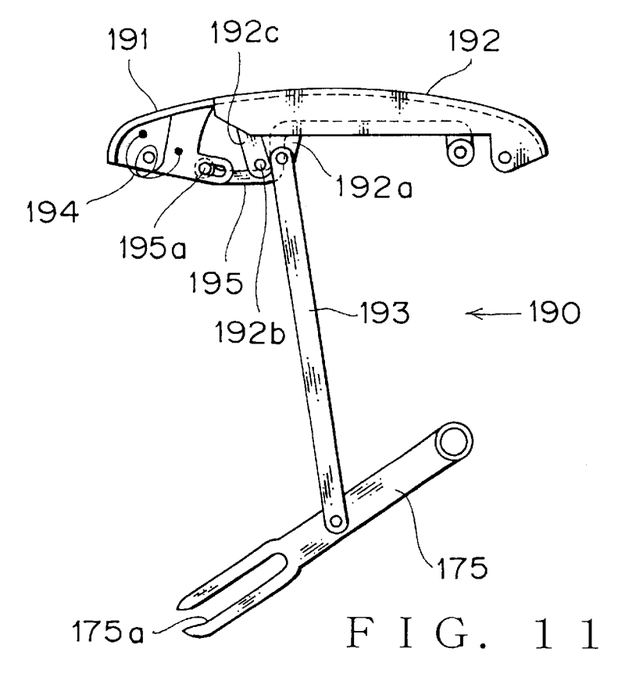
FIG. 11 is a partially sectional, side view showing a cover unit of FIG. 1, the cover unit being in its closed state.

As illustrated in a partially sectional, side view of FIG. 11, the cover unit 190 has fore and rear covers 191, 192 for closing the opening 1b, a link arm 193 for operatively connecting the rear cover 192 to the swing arm 175, a coil spring 194 urging the fore cover 191 toward its open position, a swing limiting arm 195 for pivotably connecting the fore cover 191 to a frame 1c of the opening 1b, etc.

The rear cover 192 is made of an opaque material as well as the dashboard 1 and is defined in a generally rectangular plate having frames. The rear cover 192 has a rear end pivotably supported by a peripheral surface of the upper surface 1a of the dashboard 1 at a rear side of the opening 1b in a longitudinal direction of the vehicle.

The rear cover 192 has a fore end which is pivotably connected to one end of the link arm 193 via a bracket 192a, and the other end of the link arm 193 is pivotably connected to a middle portion of the swing arm 175. The rear cover 192 further has a bracket 192c positioned at a fore side of the bracket 192a, and the bracket 192c is fitted with a pushing tag 192b at a fore end portion thereof.

Figure 12:
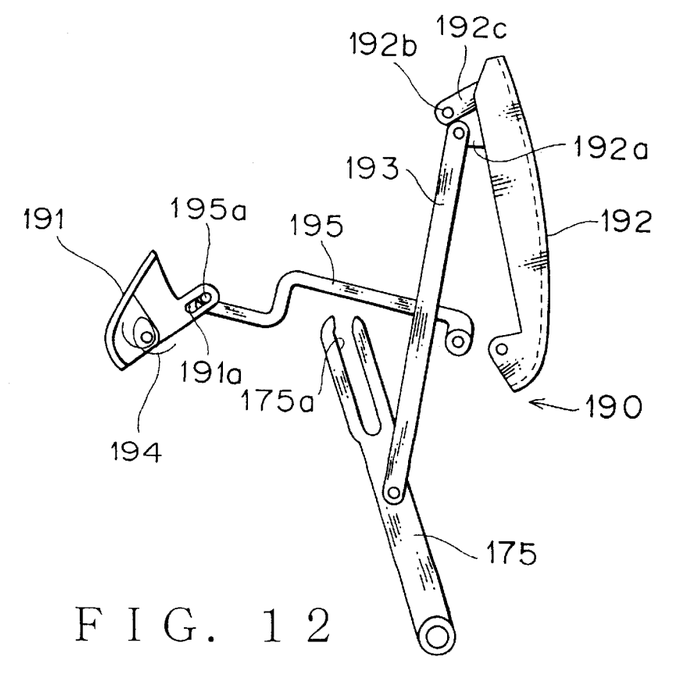
FIG. 12 is a partially sectional, side view showing the cover unit of FIG. 1, the cover unit being in its open state.

The rear cover 192 stands up relative to the upper surface 1a of the dashboard 1 as illustrated in FIG. 12, when the swing arm 175 has been swung to reach the intermediate position shown in FIG. 4. That is, the rear cover 192 opens a main rear part of the opening 1b while the standing rear cover 192 interrupts the view line S oriented from the driver's eye I toward the inside of the dashboard 1 through the opening 1b.

The rear cover 192 is laid along the upper surface 1a of the dashboard 1 as illustrated in FIG. 11, when the swing arm 175 has been swung to reach the stored position shown in FIG. 3. That is, the rear cover 192 closes the main rear part of the opening 1b so that the view line S oriented from the driver's eye I toward the dashboard 1 can not enter the inside of the dashboard 1 through the opening 1b.

The rear cover 192 has a rear face with a satin finish to prevent the reflection of light from the rear face which orients toward the opening 1b in the open state of the cover unit.

Like the rear cover 192, the fore cover 191 is made of an opaque material as well as the dashboard 1 and is defined in a generally rectangular plate having frames. The fore cover 191 has a forward end which is pivotably connected to a fore side peripheral portion of the opening 1b of the dashboard upper surface 1a. The fore cover 191 is urged toward its open position to open a fore smaller part of the opening 1b by the coil spring 194 fitted around a pivot shaft of the fore cover 191.

The fore cover 191 has a rear end formed with an elongated hole 191a which receives a connection pin 195a fitted on one end of the swing limiting arm 195. Thus, the fore cover 191 is pivotably connected to the swing limiting arm 195. The other end of the swing limiting arm 195 is pivotably supported by a rear peripheral portion of the opening 1b.

The rear cover 192 closes the rear larger part of the opening 1b as illustrated in FIG. 11, when the swing arm 175 has been swung to have an angle corresponding to the stored position shown in FIG. 3 of the combining screen 110. In the closed state, the pushing tag 192b of the rear cover 192 is pushing the swing limiting arm 195 toward the inside of the dashboard 1 against the urging opening force of the coil spring 194. The swing limiting arm 195 stops a further swing of the rear cover 192 in the closed state where the rear cover 192 is laid along the upper surface 1a of the dashboard 1.

The fore cover 191 opens the fore smaller part of the opening 1b as illustrated in FIG. 12, when the swing arm 175 has been swung to have an angle corresponding to the intermediate position shown in FIG. 4 of the combining screen 110. The pushing tag 192b of the rear cover 192 releases the swing limiting arm 195 so that the swing limiting arm 195 swings around the other end thereof by the urging opening force of the coil spring 194. The swing limiting arm 195 stops a further swing of the fore cover 191 in the open state where the fore cover 191 is standing up relative to the upper surface 1a of the dashboard 1.

Figure 13:
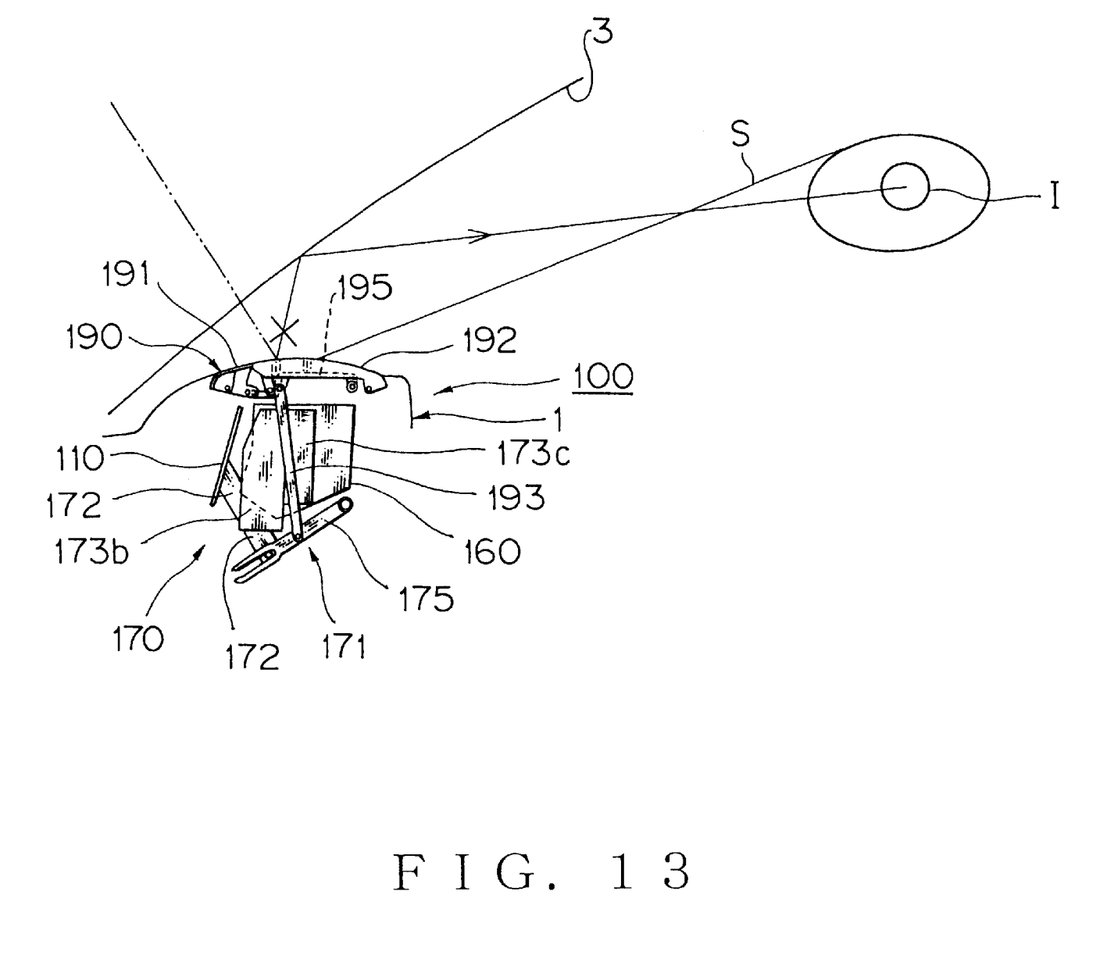
FIG. 13 is a side view illustrating an operational state of a second embodiment employing a combining screen moving back apparatus according to the present invention, the combining screen being at its stored position.
Figure 14:
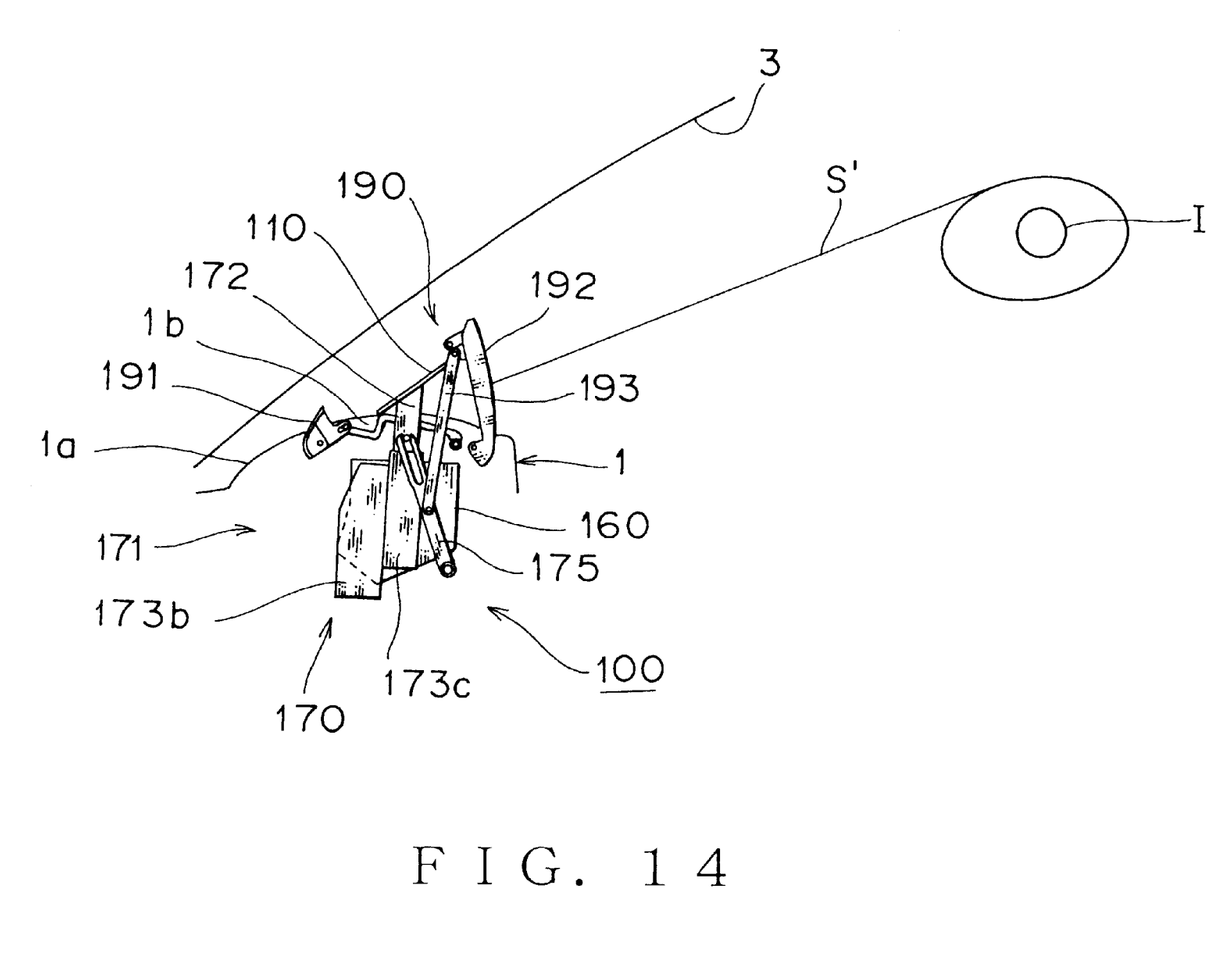
FIG. 14 is a side view illustrating an operational state of the head-up display of the second embodiment, the combining screen being at its intermediate position.

Thus, the opening and closing movement of the fore covers 191, 192 is attained by the swing of the swing arm 175 moved between the stored position and the intermediate position of the combining screen 110. The combining screen 110 is in no interference relationship with the covers 191, 192 as illustrated in FIGS. 13 and 14, since the combining screen 110 moves in relation to the swing of swing arm 175 as well as the covers 191, 192.

An upper surface of each of the covers 191, 192 has a curvature in conformity with the upper surface 1a of the dashboard 1 in the closed state thereof.

Note that the rear cover 192 of the head-up display 100 of the embodiment serves also as the intercepting plate described in the summary of the invention.

Next, an operation of thus configured head-up display 100 of the embodiment, particularly of the cover unit 190, will be discussed.

For superposing an enlarged virtual image of optical information emitted from the displaying device 130 on a foreground seen through the windshield 3 and the combining screen 110 to be visible from the driver's eye, first, the motor for moving the swing arm 175 is rotated by a predetermined number of turns. The driving force of the motor swings the swing arm 175 from one state shown in FIG. 3 corresponding to the stored position to another state shown FIG. 4 corresponding to the intermediate position of the combining screen 110.

Thereby, the rear cover 192 pivotably connected to the swing arm 175 via the link arm 193 moves to its open position, while the pushing tag 192b of the rear cover 192 releases the swing limiting arm 195 so that the fore cover 191 is opened by the urging force of the coil spring 194. Thus, the fore and rear covers 191, 192 completely open the opening 1b.

In this state, the driver can not see the inside of the dashboard 1, since the view line S to orient from the eye I toward the inside of the dashboard 1 through the upper surface opening 1b is interrupted by the rear cover 192 which has been in its open state.

Next, the second motor for driving the pulley 177b is rotated by a predetermined number of turns. The driving force of the second motor is delivered to the elevating frame 174 via the timing belt 177a so that the elevating frame 174 moves upward from its lowest position. At the same time, the combining screen 110 together with supporting strut 172 moves upward from the intermediate position shown in FIG. 4 to the operational position shown in FIG. 1 or 9.

Accordingly, an image emitted from the displaying device 130 is reflected by the magnifying reflector 150 to pass through the upper opening 161 of the case 160 and the opening 1b, and the enlarged image is projected on the combining screen 110 which is at the operational position. The enlarged image on the combining screen 110 is superposed on a foreground visible through the combining screen 110 and the windshield 3, when the view line of the driver orients toward the combining screen 110 from the eye I.

Even when an external beam like a sun beam enters the inside of the vehicle through the windshield 3 so that the external beam reaches the rear face of the opened rear cover 192, the external beam is irregularly reflected on the rear face of a satin finish to provide a surface roughness. Thus, the external beam will be little reflected on the rear face of the opened rear cover 192 not to reach the eye I via a further reflection by the windshield 3.

When an enlarged virtual image of optical information emitted from the displaying device 130 is not desired to be superposed on a foreground seen through the windshield 3, the motor for moving the pulley 177b is rotated by a predetermined number of turns opposite to the above-mentioned direction. The driving force of the motor is delivered to the elevating frame 174 via the timing belt 177a so that the elevating frame 174 moves downward from its highest position along the guide frame 176. Thus, the combining screen 110 joined to the supporting strut 172 moves downward from the state shown in FIG. 1 or 9 corresponding to the operational position to another state shown FIG. 4 corresponding to the intermediate position.

Next, the first motor for moving the swing arm 175 is rotated by a predetermined number of turns opposite in direction to the opening operation of the cover unit. The driving force of the first motor swings the swing arm 175 from the state shown in FIG. 4 corresponding to the intermediate position to the state shown FIG. 3 corresponding to the stored position of the combining screen 110.

Thereby, the rear cover 192 pivotably connected to the swing arm 175 via the link arm 193 moves to its closure position, while the pushing tag 192b of the rear cover 192 limits the swing of the swing limiting arm 195 so that the fore cover 191 is closed against the urging force of the coil spring 194. Thus, the covers 191, 192 completely close the opening 1b.

Accordingly, the closed rear cover 192 does not interrupt a view line S originated from the eye I around the opening 1b, allowing a wider view for the eye I.

In the closed state of the fore and rear covers 191, 192, even when an external beam enters the inside of the vehicle through the windshield 3 so that the external beam reaches the covers 191, 192, the external beam is irregularly reflected on the upper surfaces each having a surface roughness of the covers 191, 192. Thus, the external beam will be little reflected on the upper surfaces of the covers 191, 192 not to reach the eye I even via a further reflection by the windshield 3.

The head-up display 100 of the embodiment of the present invention superposes a virtual image of optical information emitted from the displaying device 130 on a foreground seen through the windshield 3 of the vehicle so as to be visible from a driver's eye I. The displaying device is disposed in the dashboard, and the combining screen 110 is positioned between the windshield 3 and the eye I at the operational condition of the combining screen 110. The combining screen 110 is moved within the dashboard 1 from the stored position located in a fore side of the case 160 accomodating the displaying device 130 to the intermediate position located above the case 160. That is, each of the guide pins 172a of the supporting strut 172 moves from the bottom end to the top end of each arc-shaped guide cam slot 173a, while the swing arm 175 swings to move the supporting strut 172. The guide cam slot 173a is defined across the fixed base frame 173b and the movable base frame 173c. Then, the elevating frame 174 is moved upward with the locking levers 173f of the movable base frame 173c holding the guide pins 172a each positioned at the top of each guide cam slot 173a. Thereby, the movable base frame 173c moves the supporting strut 172 joined to the combining screen 110 from the intermediate position to the operational position.

Thus, the combining screen 110 is received not above the case 160 accommodating the displaying device 130 but in a fore side of the case 160 within the dashboard 1 when the combining screen 110 is not used. Because, it is easier to increase the longitudinal distance than the height of the dashboard 1 to provide an accommodation space for the combining screen 110 around the case 160.

In the embodiment, the combining screen 110 is moved between the stored position and the intermediate position within the dashboard 1 by the cam mechanism having the guide cam slots 173a and the guide pins 172a, while the combining screen 110 is moved between the intermediate position and the operational position via the pin holding mechanism having the locking levers 173f. However, the cam mechanism can be modified to be integrated with the pin holding mechanism.

The head-up display 100 of the embodiment of the present invention employs the tension spring 174c to urge the spring securing pin 173h of the movable base frame 173c and the spring securing pin 174b of the elevating frame 174 to move them toward each other. The urging force allows the locking levers 173f to hold the guide pins 172a positioned at the top portions of the guide cam slots 173a even during the downward movement of the elevating frame 174.

In the head-up display 100 of the embodiment, the combining screen 110 is located in a fore side of the case 160 accommodating the displaying device 130 when received in the stored position, while each link unit 171 of the elevating unit 170 is located in each lateral side of the case 160. Thus, the combining screen 110 is in no interference relationship with the link unit 171 when moved between the stored position and the intermediate position. This configuration minimizes an additional accommodation space for the head-up display 100 in the dashboard 1.

In the head-up display 100 of the embodiment, the inclination angle of the combining screen 110 varies between the stored position and the intermediate position. Thus, the combining screen 110 is located close to the case 160 at the stored position to minimize the accommodation space of the combining screen 110, while the combining screen 110 has a desired inclination angle generally parallel to the windshield 3 at the operational position.

The cover unit 190 may be configured to move independently of the movement of the combining screen 110. It may be an optional construction that the rear cover 192 of the cover unit 190 serves to interrupt a view line originated from the eye I to prevent the view line from entering the inside of the dashboard 1 through the opening 1b.

However, it is advantageous that the rear cover 192 serves to interrupt the view line S originated from the eye I to prevent the view line S from entering the inside of the dashboard 1 through the opening 1b to eliminate an annoyance for the driver's operation.

In the head-up display 100 of the embodiment, the fore and rear covers 191, 192 define a part of the upper surface 1a of the dashboard 1 in the closed state thereof and have the upper surfaces each treated to have a surface roughness to prevent light reflection as well as the dashboard upper surface 1a. The surface treatment of the covers 191, 192 may be a satin finish to provide a surface roughness.

In the head-up display 100 of the embodiment, the swing arm 175 is moved by the driving force of the first motor in relation to the movement of the combining screen 110 between the stored position and the intermediate position.

However, the movement of the swing arm 175 may be started in response to the ON operation of the displaying device 130 so that the combining screen 110 moves from the stored position to the intermediate position and in response to the OFF operation of the displaying device so that the combining screen 110 moves from the intermediate position to the stored position.

What is claimed is:

1. A method for moving back a combining screen in a dashboard of a vehicle when the combining screen is not used, the combining screen being used for receiving an image emitted from a displaying device to superpose the image on a foreground of the vehicle such that the superposed image is visible for a driver's eye, the displaying device disposed in the dashboard, the combining screen positioned above the dashboard and inclined by a predetermined angle relative to an upward direction of the vehicle in an operational state of the combining screen, the method comprising the steps of:

moving the combining screen along a straight line between an operational position and an intermediate position of the combining screen, the intermediate position located in the dashboard and above the displaying device, and moving the combining screen along a curve between the intermediate position and a stored position where the combining screen is located adjacent to the displaying device in a longitudinal direction of the vehicle within the dashboard.

2. An apparatus for moving back a combining screen in a dashboard of a vehicle when the combining screen is not used, the combining screen being used for receiving an image emitted from a displaying device to superpose the image on a foreground of the vehicle such that the superposed image is visible for a driver's eye, the displaying device disposed in the dashboard, the combining screen positioned above the dashboard and inclined by a predetermined angle relative to an upward direction of the vehicle in an operational state of the combining screen, the apparatus comprising:

an inner moving means for moving the combining screen between an intermediate position located above the displaying device in the dashboard and a stored position where the combining screen is located adjacent to the displaying device in a longitudinal direction of the vehicle in the dashboard and an outer moving means for moving the combining screen between the intermediate position and an operational position of the combining screen.

3. The apparatus as claimed in claim 2 wherein one of the inner and outer moving means has a cam channel and the combining screen has a pin movable along the cam channel, the cam channel and the pin defining a cam moving mechanism to move the combining screen, while the other of the inner and outer moving means has a pin holding mechanism for holding the pin, the pin holding mechanism movable with the pin to move the combining screen.

4. The apparatus as claimed in claim 3 wherein the outer moving means includes the pin holding mechanism, and the pin holding mechanism has a pin locking lever, a pin locking and releasing means, and an urging means for urging the pin locking lever toward the pin, the pin locking lever being movable together with the pin between the operational position and the intermediate position, the pin locking and releasing mechanism keeping the pin locking lever holding the pin between the operational position and the intermediate position, the pin locking and releasing mechanism keeping the pin locking lever disengaged with the pin between the intermediate position and the stored position, the urging means urging the pin locking lever toward the pin between the operational position and the intermediate position so that the pin locking lever can hold the pin.

5. The apparatus as claimed in claim 2 wherein the inner and outer moving means are located adjacent to the displaying device in a lateral direction of the vehicle.

6. The apparatus as claimed in claim 2 wherein the inner moving means moves the combining screen with varying the inclination of the combining screen between the intermediate position and the stored position.

7. The apparatus as claimed in claim 2 further comprising a cover closing an opening of the dashboard and a link for moving the cover, the opening being used for passing the combining screen when the combining screen moves between the intermediate position and the operational position, the link connected to the combining screen to move the cover in response to the movement of the combining screen.

8. The apparatus as claimed in claim 7 wherein the link is operatively connected to the inner moving means so that the link can open and close the cover in response to the movement of the combining screen between the intermediate position and the stored position.

9. The apparatus as claimed in claim 8 wherein the cover has an intercepting plate that interrupts a driver's view line to enter the dashboard through the opening when the opening is opened.

10. The apparatus as claimed in claim 2 wherein the outer moving means moves the combining screen along a straight line between the operational position and the intermediate position, and the inner moving means moves the combining screen along a curve between the intermediate position and the stored position.

11. The apparatus as claimed in claim 2 wherein the inner moving means moves the combining screen along a curve between the intermediate position and the stored position such that the combining screen stands in a substantially vertical direction of the vehicle at the stored position.

12. The apparatus as claimed in claim 2 wherein the inner moving means moves the combining screen along a curve between the intermediate position and the stored position such that the combining screen is located in front of the displaying device in a longitudinal direction of the vehicle at the stored position.

13. The apparatus as claimed in claim 12 wherein the inner moving means has a swing lever, and the combining screen is provided with a link pin which cooperatively is engaged with the swing lever for moving the combining screen along the curve between the intermediate position and the stored position.

14. The apparatus as claimed in claim 13 wherein the swing lever is formed with an elongated slot which is slidably engaged with the link pin, and the link pin can be disengaged from the elongated slot at the intermediate position of the combining screen.

15. The apparatus as claimed in claim 12 wherein the inner moving means has a base frame and a pair of guide channels formed in the base frame, and the combining screen has a strut fixed to the combining screen and a pair of guide pins fitted on the strut, the pair of guide pins being cooperatively engageable with the pair of guide channels for moving the combining screen along the curve between the intermediate position and the stored position.

16. The apparatus as claimed in claim 15 wherein the pair of guide pins of the strut can be disengaged from the pair of guide channels of the base frame at the intermediate position of the combining screen.

17. The apparatus as claimed in claim 13 further comprising a cover closing an opening of the dashboard and a link arm for moving the cover, the opening being used for passing the combining screen when the combining screen moves between the intermediate position and the operational position, the link arm operatively connected to the swing lever of the inner moving means to move the cover in response to the movement of the combining screen.

18. The apparatus as claimed in claim 2 wherein the outer moving means has a fixed frame and a movable frame for moving the combining screen between the intermediate position and the operational position, and the movable frame can hold the combining screen while the movable frame can be moved linearly along the fixed frame.

19. The apparatus as claimed in claim 18 wherein the outer moving means has a timing belt driven by a motor for moving the movable frame.

20. The apparatus as claimed in claim 19 wherein the timing belt has an elasticity enough for elevating the movable frame.

* * * * *